(12) United States Patent
Zeng

(10) Patent No.: US 6,854,478 B1
(45) Date of Patent: Feb. 15, 2005

(54) FLUID-CONTROLLED VALVE FOR PIPELINE PIG

(76) Inventor: Xiangwei Zeng, 11, 4<sup>th</sup> Block of Renmin Nanlu, Chengdu, Sichuan Province, 610041 (CN)

( * ) Notice: Subject to any disclaimer, the term of this patent is extended or adjusted under 35 U.S.C. 154(b) by 0 days.

(21) Appl. No.: 09/979,807

(22) PCT Filed: May 12, 2000

(86) PCT No.: PCT/CN00/00114
§ 371 (c)(1),
(2), (4) Date: Apr. 9, 2002

(87) PCT Pub. No.: WO00/70250
PCT Pub. Date: Nov. 23, 2000

(30) Foreign Application Priority Data

May 18, 1999 (CN) ........................................ 99114868 A

(51) Int. Cl.<sup>7</sup> ........................ B08B 9/055; F16K 31/122
(52) U.S. Cl. ...................... 137/242; 251/30.01; 251/31; 251/58; 15/104.061
(58) Field of Search ............................. 137/15.07, 242, 137/331, 487.5, 245.5; 251/30.01, 31, 58; 15/104.061

(56) References Cited

U.S. PATENT DOCUMENTS

| | | | | |
|---|---|---|---|---|
| 3,908,682 A | * | 9/1975 | Thompson | 137/15.07 |
| 4,073,303 A | * | 2/1978 | Foley, Jr. | 137/15.07 |
| 4,079,619 A | * | 3/1978 | Dobesh | 73/1.01 |
| 4,460,009 A | * | 7/1984 | Nanci et al. | 137/331 |
| 4,589,627 A | * | 5/1986 | Grotloh | 251/30.01 |
| 4,672,992 A | * | 6/1987 | Vanderlaan et al. | 137/331 |
| 5,193,572 A | * | 3/1993 | Le Devehat | 137/244 |
| 5,251,148 A | * | 10/1993 | Haines et al. | 137/487.5 |
| 5,779,217 A | * | 7/1998 | Lucas et al. | 251/30.01 |
| 5,810,326 A | * | 9/1998 | Miller | 251/58 |
| 6,098,231 A | * | 8/2000 | Smith et al. | 15/104.061 |
| 6,328,052 B1 | * | 12/2001 | Loyning | 15/104.061 |

FOREIGN PATENT DOCUMENTS

| | | |
|---|---|---|
| CN | 2293690 | 10/1998 |
| CN | 2356202 | 12/1999 |
| WO | WO 95/12464 | 5/1995 |

* cited by examiner

Primary Examiner—David A. Scherbel
Assistant Examiner—Ramesh Krishnamurthy
(74) Attorney, Agent, or Firm—Nelson Mullins Riley & Scarborough, LLP

(57) ABSTRACT

A fluid control valve for a pipeline pig includes a main valve and a mechanism for operating the main valve. The main valve comprises a valve body communicated to a fluid pipe, a main valve core movably disposed in the inner chamber of the valve body, and a main valve stem connected to the main valve core. The operating mechanism includes a hydrocylinder, which comprises a piston disposed in the cylinder, and a piston rod connected to the piston. The piston rod is transmissibly connected with the main valve stem so as to drive the main valve core by the main valve stem. A valve device includes a pilot valve, positioned in the pipeline which communicates the fluid pipe with the hydrocylinder, and an operator for controlling the actuation of the pilot valve so as to enable the piston to move reciprocally by the pressure of fluid in the fluid pipe.

39 Claims, 6 Drawing Sheets

FLUID-CONTROLLED VALVE FOR PIPELINE PIG

FIELD OF THE INVENTION

The present invention relates to a fluid-controlled valve, and in particular to a fluid-controlled valve for pipeline pig, which is capable of allowing a pipeline pig to pass through.

BACKGROUND OF THE INVENTION

A pipeline for transferring fluid, especially a pipeline having deposit sediment and exfoliation corrosion, needs to be cleaned through running a pipeline pig in the pipeline to resume the transfer performance of the pipeline. Generally, since the pipeline pig has to closely match the hole of the pipe, the pipeline pig can only be used to clean a section of pipeline provided with fluid control valves and associated means capable of allowing the pipeline pig to pass through. Thus, the pipe-cleaning work is difficult to do and takes a long period of time, resulting in much labor and high cost. A fluid control valve which can both control the fluid and allow a pipeline pig to pass is known in the art. A known sluice valve, for example, capable of allowing a pipeline pig to pass includes a through hole, which matches the hole of the pipe, formed on a plate valve clack. The blind flange portion of the valve clack is used to realize the function of a gate valve, and the through hole in the valve clack is used to let a pipeline pig to pass through. This arrangement only solves the problem of the passage of a pipeline pig through a ram valve, but not other valves. And when cleaning the pipe, the valves are controlled manually or by external hydraulic means. As a result, the valve has the disadvantages that it is inconvenient to control and requires an external energy source.

SUMMARY OF THE INVENTION

In view of this, the object of the present invention is to provide a fluid-controlled valve for pipeline pig which is capable of allowing a pipeline pig to pass through, and the working state of the fluid-controlled valve can be controlled by the fluid to be controlled.

To achieve the object of the invention, there is provided in an embodiment of the present invention a fluid-controlled valve for pipeline pig which comprises a main valve and a controlling device. The main valve comprises a valve body connected with a fluid pipe, a main valve core movably disposed in the inner cavity of the valve body and a main valve stem connected with the main valve core. The controlling device comprises a hydraulic cylinder having a piston disposed therein and a piston rod connected with the piston, where the piston rod is operationally connected with the main valve stem so as to control the main valve core through the main valve stem. Valve means includes a pilot valve provided in a pipeline which communicates the fluid pipe and the hydraulic cylinder. A controller controls the actuation of the pilot valve so as to control the reciprocating movement of the piston by the pressurized fluid in the fluid pipe.

The main valve of the present invention can be a self-operated valve, such as an adjustable differential flow shuttle valve, a check valve, a shuttle check valve, and a shuttle type pipeline-bursting-protection valve. The main valve can also be an external-operated valve, such as a ball valve, a control valve, a shuttle control valve, a stop valve, and a shuttle stop valve.

The fluid-controlled valve for pipeline pig of the present invention has following advantages and effects.

1. With the arrangement of the present invention in which the hydraulic cylinder is transmissibly coupled with the main valve and the pilot valve cooperates with the fluid pipe, the pressurized fluid in the fluid pipe can be introduced into and discharged from the hydraulic cylinder, and the kinetic energy of the fluid itself is used to drive the piston of the hydraulic cylinder, thereby controlling the movement of the valve core of the main valve through the valve stem, opening the main valve to cause its flow path to coincide and communicate with the fluid pipe, so that the pipeline pig can pass through the main valve smoothly;

2. In the present invention, different kinds of controllers are used to control the pilot valve. A controller may include, for example, an electromagnetic switch and an electric controller; an electromagnetic switch, a sensor and an electric controller; a hydraulic pressure-holding cylinder and a restoring valve; or a lever. All of these controllers are capable of utilizing the moving pipeline pig to keep the main valve in a state of allowing the pipeline pig to pass until the pipeline pig has passed through the valve and then causing the main valve to return to the normal operating state, thereby having an advantage of ensuring that the pipeline pig can pass through the main valve smoothly. Among these controllers, the controller comprising a hydraulic pressure-holding cylinder and a restoring valve is particularly suitable for the applications where there is no power, such as electricity and the like, or no available human operator;

3. With the controller comprising an electromagnetic switch and an electric controller, the main valve is controlled via the electric controller, the pilot valve and the hydraulic cylinder. This arrangement not only has the advantage of being capable of causing the main valve to move to a state of allowing the pipeline pig to pass through, keeping the state by a time delay and returning to the normal operation state, but also has the advantage of being capable of controlling the fluid by operating the main valve. This is particularly suitable for applications where there is no power, such as electricity and the like, or no available human operator.

4. With the two-way control valve of the invention, it is possible to adjust the flow rate of the fluid introduced into and discharged from the hydraulic cylinder, thereby having the advantage of adjusting the moving speed of the main valve.

5. The main valve of the invention may present different configurations. The main valve can be constructed as follows: (1) the main valve stem is coaxial connected with the piston rod of the hydraulic cylinder, and the main valve core reciprocates in the cavity of the main valve; (2) the main valve stem is rotatably coupled with the main valve core and is perpendicularly connected with the piston rod of the hydraulic cylinder through a gear-rack pair, so that the main valve stem reciprocates while rotating; (3) the valve core of the main valve reciprocates in the main valve cavity; (4) or the valve core of the main valve rotates in the main valve cavity.

BRIEF DESCRIPTION OF THE ACCOMPANYING DRAWINGS

The preferred embodiments of the invention will be described in detail in connection with accompanying drawings, in which FIG. 1 is a schematic view showing the structure of a fluid-controlled valve for pipeline pig in accordance with the first embodiment of the invention, wherein the main valve is in a normal working state for controlling the fluid;

DETAILED DESCRIPTION OF THE PREFERRED EMBODIMENTS

Embodiment 1

Figure 1:
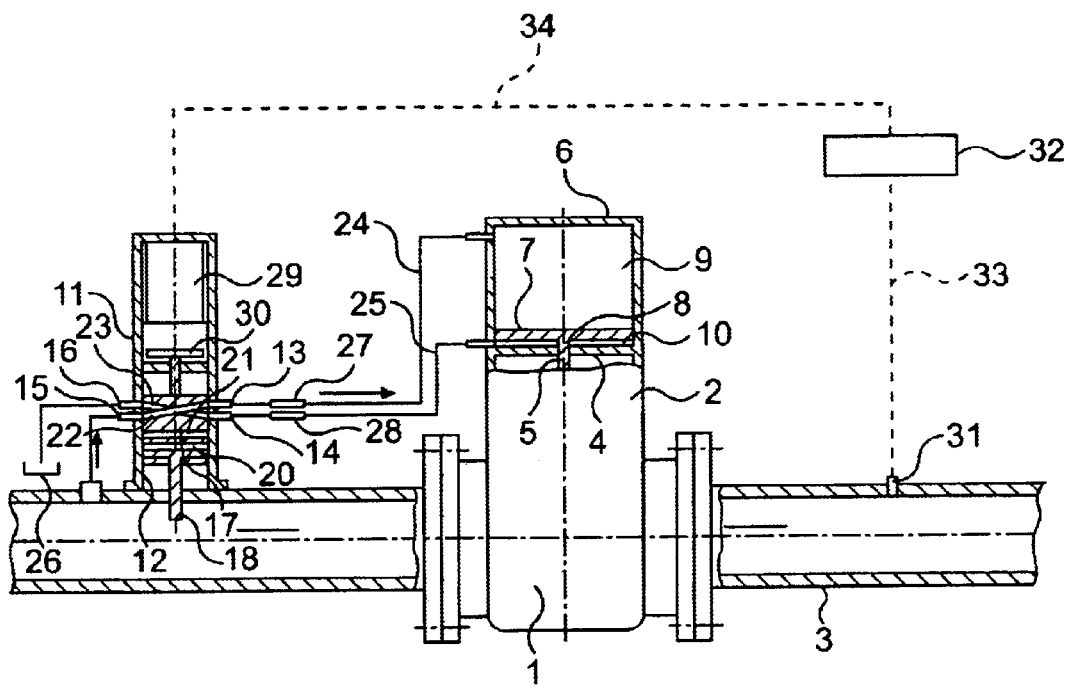
Figure 2:
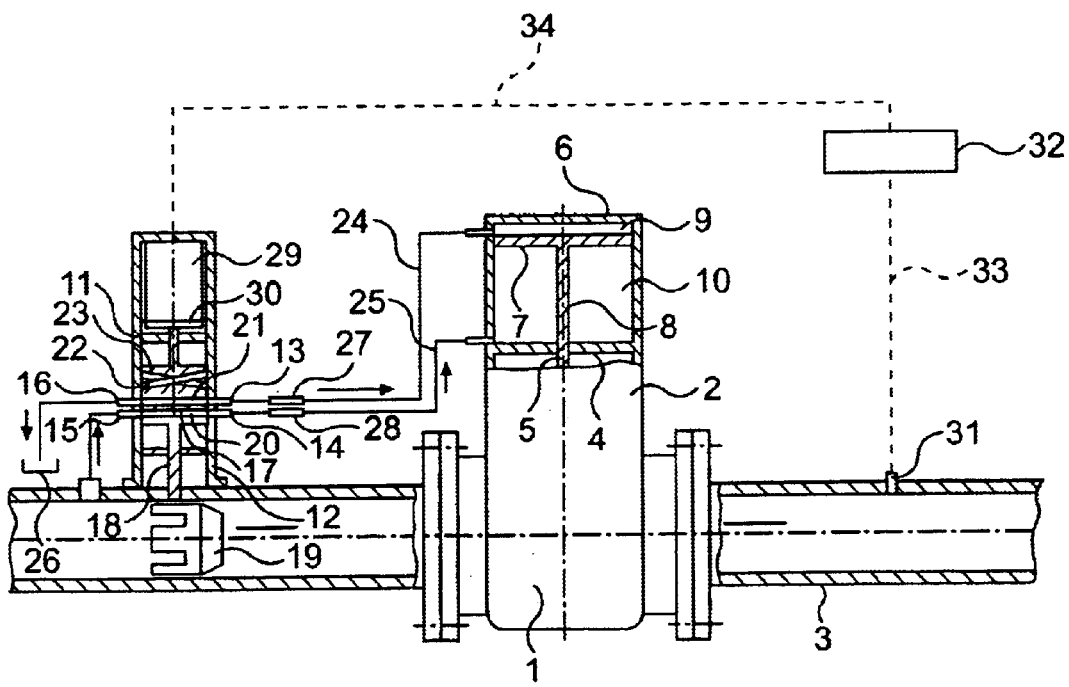
FIG. 2 is a schematic view showing the structure of a fluid-controlled valve for pipeline pig in accordance with the first embodiment of the invention, wherein the main valve is in a state for allowing a pipeline pig to pass.

FIGS. 1 and 2 illustrate the first embodiment of the fluid-controlled valve for pipeline pig in accordance with the present invention. As shown in FIGS. 1 and 2, the fluid-controlled valve for pipeline pig of this embodiment is comprised of a main valve 1 and a controlling device, where the controlling device is comprised of a hydraulic cylinder 6, a pilot valve 11 and a controller.

The main valve 1 comprises a valve body 2 having a cavity of a conventional shape and is connected to a fluid pipe 3 in a conventional manner. The main valve is formed with a flow path which matches with the flow path of the fluid pipe so as to allow a pipeline pig 19 to pass. In other words, the shape and size of the flow path of the main valve are substantially the same as the shape and size of the flow path of the fluid pipe. On the upper end of the valve body 2 there is a valve cover 4. The valve body can be integral with the valve cover as shown in the figures, or they can be separate members and coupled with each other through a flange. The valve stem 5 of the main valve can be fixedly secured to, or rotatably connected to the valve core (not shown) of the main valve. The valve core of the main valve can reciprocate in the valve body 2, and thus the main valve can be a gate valve, a sluice valve or a plunger valve.

The hydraulic cylinder 6 is a conventional cylinder which is integrated with the main valve 1. A piston 7 reciprocates in the hydraulic cylinder and is fixedly secured to a piston rod 8. The chamber of the hydraulic cylinder is divided by the piston 7 into an upper chamber 9 and a lower chamber 10. The valve stem 5 of the main valve extends through the valve cover 4 and is integrally coupled with the piston rod 8 coaxially.

The pilot valve 11 is a conventional two-position multi-way piston valve, and can be installed by means of a support on the fluid pipe 3 on the upstream side of the main valve. In the case 12 of the pilot valve there are formed an upper chamber connection port 13, a lower chamber connection port 14, a fluid pipe connection port 15 and an atmosphere connection port 16. The pilot valve core 17 inside the valve case is fixedly coupled to the pilot valve stem 18, and the lower end of the pilot valve stem extends into the fluid pipe 3 by an appropriate depth such that a running pipeline pig 19 can push upward the pilot valve stem and hence the pilot valve core. The upper end of the pilot valve stem 18 extends out of the valve case and connects with a disk 30. Between the pilot valve stem and the fluid pipe there should be disposed sealing means. The pilot valve core 17 is formed with a passage way 20 and a release passage way 21, when the core is at its upper position inside the case, the passage way 20 connects the lower chamber connection port 14 and the fluid pipe connection port 15, and the release passage way 21 connects the upper chamber connection port 13 and the atmosphere connection port 16. The pilot valve core 17 is also formed with a restoring passage way 22 and a release passage way 23. When the core is at its lower position inside the case, the restoring passage way 22 connects the upper chamber connection port 13 and the fluid pipe connection port 15, and the release passage way 23 connects the lower chamber connection port 14 and the atmosphere connection port 16. The upper chamber connection port 13 is connected with the upper chamber 9 of the hydraulic cylinder 6 via a pipeline 24, and the lower chamber connection port 14 is connected with the lower chamber 10 of the hydraulic cylinder via a pipeline 25. The fluid pipe connection port 15 is connected with the fluid pipe 3 via a pipeline; and the atmosphere connection port 16 can be opened to atmosphere via a pipeline, and a reservoir 26 can be disposed under the pipeline outlet. Two-way control valves 27 and 28 are respectively provided in pipelines 24 and 25. The inventor's adjustable differential flow shuttle valve (Chinese Patent No. 87103004.7 granted to the inventor and filed in 1987) can be used as the two-way control valves to control the flow of fluid in two directions in pipelines. A two-position multi-way valve with a rotating valve core can also be used as the pilot valve, and when using such a valve, a corresponding driving mechanism for the valve core should be used.

The controller is comprised of an electromagnetic switch 29, a sensor 31, an electric controller 32 and the like. An electromagnetic switch with a conventional structure can be used as the electromagnetic switch 29. Under the control of the electric controller, the electromagnetic switch can attract and engage or release the disk 30 which is connected with the upper end of the pilot valve stem 18. The electromagnetic switch can be formed such that it shares a common case with the pilot valve. A conventional inductance sensor, which can cooperate with the pipeline pig 19, can be used as the sensor 31 and is mounted to the fluid pipe 3 on the downstream side of the main valve. As the electric controller 32, a conventional electric controller can be used, and the electric controller is mounted at such a place that it is easy to operate. Wires 33 and 34 are used to electrically connect the electric controller with the electromagnetic switch 29 and the sensor 31 respectively.

When the fluid-controlled valve for pipeline pig of this embodiment is in a set, normal working state, e.g. for controlling the fluid, the pilot valve stem 18 of the pilot valve 11 extends into the fluid pipe 3, as shown in FIG. 1. The pilot valve core 17 is at its lower position in the case such that the passage way 20 and the release passage way 21 in the pilot valve core are cut off simultaneously, whereas the restoring passage way 22 connects the upper chamber connection port 13 and the fluid pipe connection port 15, while the release passage way 23 connects the lower chamber connection port 14 and the atmosphere connection port 16. The pressurized fluid in the fluid pipe 3 enters the upper chamber 9 of the hydraulic cylinder 6 through fluid pipe connection port 15 of pilot valve 11, restoring passage way 22, upper chamber connection port 13, pipeline 24 and two-way control valve 27 such that the fluid pressure in the upper chamber of the hydraulic cylinder is substantially equal to the fluid pressure in the fluid pipe 3. The lower chamber 10 of the hydraulic cylinder is opened to the atmosphere through pipeline 25, lower chamber connection port 14 of pilot valve 11, release passage way 23 and atmosphere connection port 16 such that the pressure in the lower chamber 10 of the hydraulic cylinder is equal to the air pressure. That is, the pressure in the upper chamber of hydraulic cylinder 6 is greater than that in the lower chamber. Under the action of the fluid pressure, the piston 7 in hydraulic cylinder 6 is pushed to the lower portion of the hydraulic cylinder, and the main valve core is pushed to its lower position by the piston via the piston rod 18 and the main valve stem 5 such that the fluid-controlled valve is in the normal working state.

At the time of using the pipeline pig 19 to clean the fluid pipe 3, as shown in FIG. 2, when the pipeline pig 19 comes to the pilot valve 11 at the upstream side of the main valve 1, the pilot valve stem 18 is pushed upward, causing the pilot valve core 17 to ascend to the upper portion of the case. At this time, the disk 30 engages the electromagnetic switch 29 and the electromagnetic switch is energized to attractively engage the disk, causing (1) the restoring passage way 22 and the release passage way 23 of the pilot valve core 17 to be cut off simultaneously, (2) the passage way 20 to connect the lower chamber connection port 14 and the fluid pipe connection port 15, and at the same time (3) the release passage way 21 to connect the upper chamber connection port 13 and the atmosphere connection port 16. The pressurized fluid in the fluid pipe 3 enters the lower chamber 10 of the hydraulic cylinder 6 through fluid pipe connection port 15 of pilot valve 11, passage way 20, lower chamber connection port 14, pipeline 25 and two-way control valve 28, such that the fluid pressure in the lower chamber is substantially equal to the fluid pressure in the fluid pipe 3. Upper chamber 9 of the hydraulic cylinder 6 is opened to the atmosphere through pipeline 24, upper chamber connection port 13 of pilot valve 11, release passage way 21 and atmosphere connection port 16 such that the pressure in the upper chamber 9 of the hydraulic cylinder is the air pressure. That is, the pressure in the lower chamber of the hydraulic cylinder is greater than that in the upper chamber. Under the action of the electromagnetic switch 29, the pilot valve core 17 of the pilot valve 11 remains at its ascended position such that the flow path from the fluid pipe 3 to the lower chamber 10 of hydraulic cylinder 6 is in an open state, and the pressurized fluid in the fluid pipe 3 continuously enters the lower chamber of the hydraulic cylinder such that the piston 7 is pushed upward to its upper position in the hydraulic cylinder. Thus, the main valve core is lifted through the main valve stem 5 of the main valve and the piston rod 8, and the main valve 1 presents a fully opened state with its flow path coinciding and communicating with the flow path of the fluid pipe, so that the running pipeline pig 19 can pass through smoothly, and the fluid-controlled valve is in a state of allowing the pipeline pig to pass.

When the pipeline pig 19 comes to the sensor 31 on the downstream side of the main valve 1, the sensor 31 sends to the electric controller 32 via the wire 33 a signal indicative of the passage of the pipeline pig through the main valve. After receiving the signal transmitted by the sensor 31 indicating that the pipeline pig has passed through the main valve, the electric controller cuts off the power to the electromagnetic switch so as to release the disk 30 and hence the pilot valve core 17. The pilot valve core descends and returns to its original position under the action of gravity of the pilot valve core or a biasing device otherwise provided. The pressurized fluid in the fluid pipe 3 again enters the upper chamber 9 of the hydraulic cylinder 6 via the pilot valve 11. At the same time, the fluid in the lower chamber 10 of the hydraulic cylinder is discharged to the atmosphere or the reservoir 26 via the pilot valve, and the piston 7 descends and returns to its original position. Thus, the fluid-controlled valve returns to its normal working state.

When the present fluid-controlled valve is in its normal working state for fluid control, the pilot valve 11 can be controlled by the electric controller 32 through the electromagnetic switch 29 to selectively communicate the fluid pipe 3 or the atmosphere with the upper or lower chamber 9 or 10 of the hydraulic cylinder according to requirements, so as to control the ascension or descension of the piston 7 in the hydraulic cylinder, and then to control the opening, closing and degree of openness of the main valve through the piston rod 8 and the main valve stem 5, thereby realizing the control of the fluid.

Embodiment 2

Figure 3:
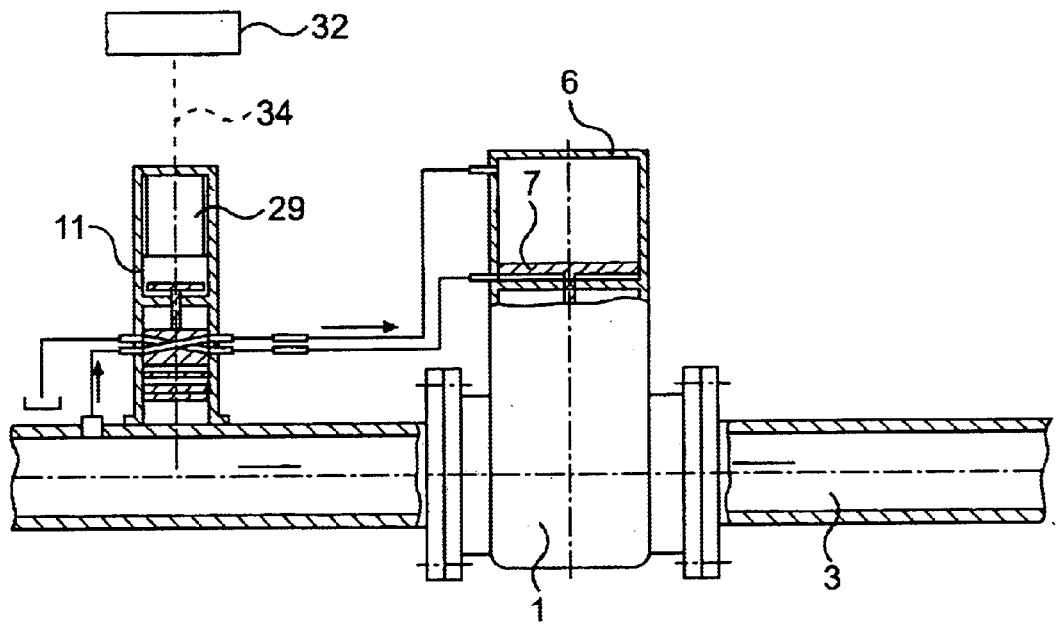
FIG. 3 is a schematic view showing the structure of a fluid-controlled valve for pipeline pig in accordance with the second embodiment of the invention.

FIG. 3 illustrates the second embodiment of the fluid-controlled valve for pipeline pig in accordance with the present invention. As shown in FIG. 3, the embodiment's general arrangement is substantially the same as that of embodiment 1, except that the pilot valve 11 is not provided with a pilot valve stem 18 extendable into the fluid pipe, and the sensor 31 fitted onto the fluid pipe and the wire 33 connecting the sensor are omtined.

In the fluid-controlled valve for pipeline pig of the second embodiment, the electric controller is used to control the operation of the pilot valve and then to control the piston 7 in the hydraulic cylinder and hence the ascension and descension of the main valve core of the main valve 1, thereby achieving the fluid control function and the pig passage function of the main valve. The fluid-controlled valve for pipeline pig of this embodiment has the advantage of a simple arrangement.

Embodiment 3

Figure 4:
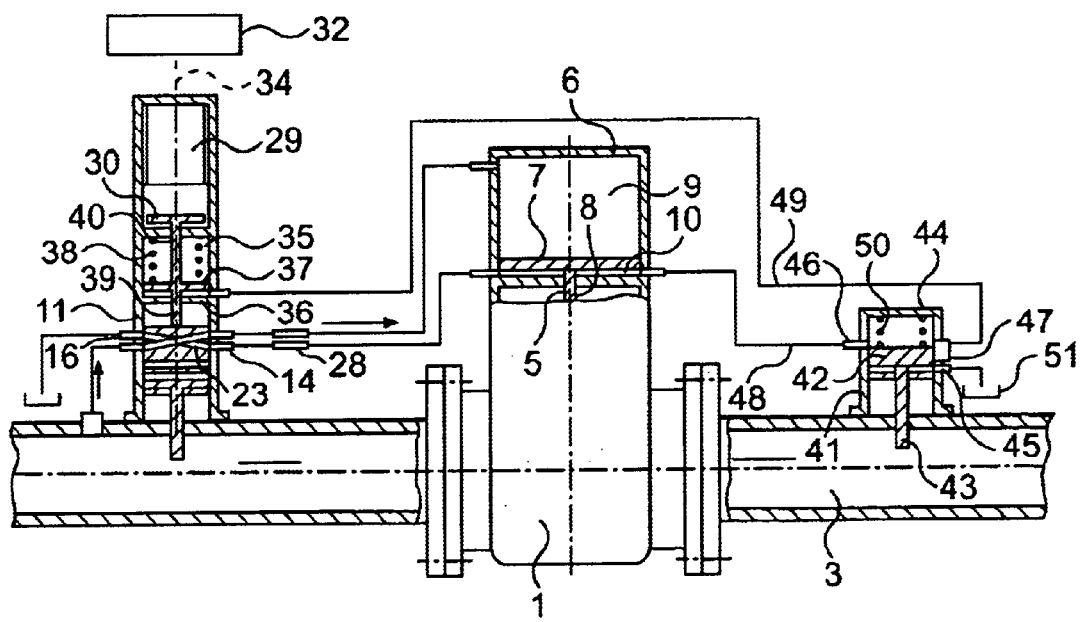
FIG. 4 is a schematic view showing the structure of a fluid-controlled valve for pipeline pig in accordance with the third embodiment of the invention, wherein the main valve is in a normal working state for controlling the fluid.
Figure 5:
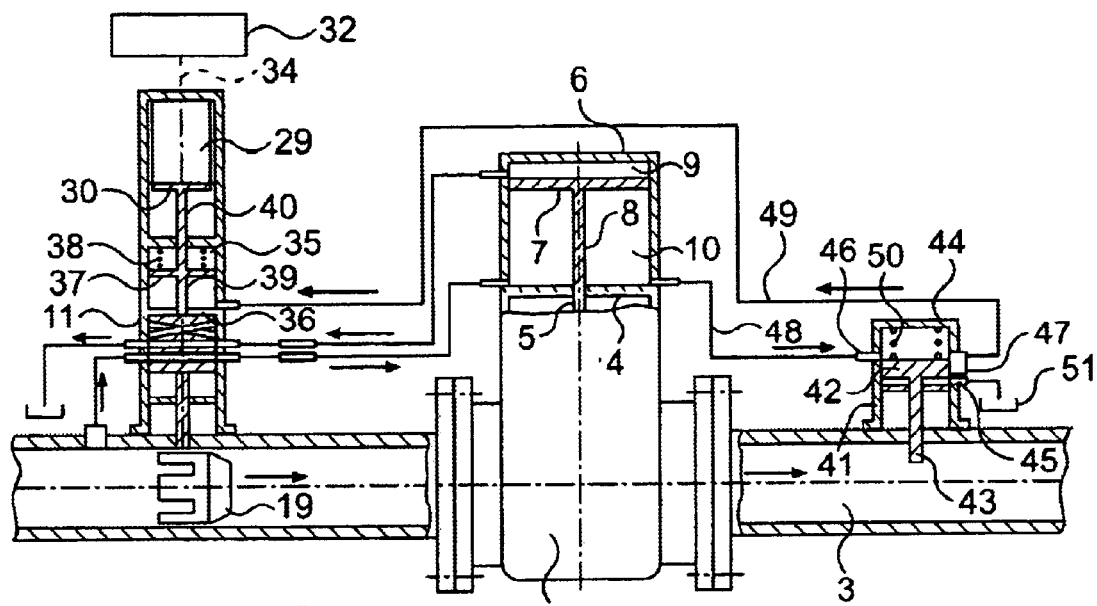
FIG. 5 is a schematic view showing the structure of a fluid-controlled valve for pipeline pig in accordance with the third embodiment of the invention, wherein the main valve is in a state for allowing a pipeline pig to pass.
Figure 6:
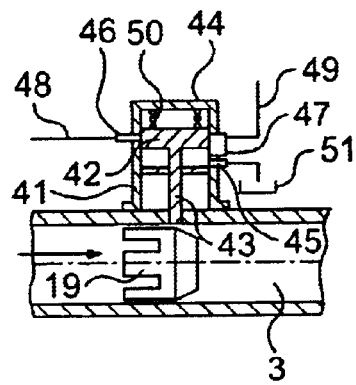
FIG. 6 is a partial view, wherein a restoring valve is pushed to its upper position by a pipeline pig.

FIGS. 4, 5 and 6 illustrate the third embodiment of the fluid-controlled valve for pipeline pig in accordance with the present invention. As shown in FIGS. 4, 5 and 6, the main valve 1 and the hydraulic cylinder 6 and the pilot valve 11 of the controlling device in the third embodiment are the same as those in embodiment 1, but the controller of the controlling device is comprised of a hydraulic pressure-holding cylinder 35, a restoring valve 41, etc.

The hydraulic pressure-holding cylinder 35 is a conventional piston hydraulic cylinder and can be superposed on the top of the pilot valve 11 to be integral with the pilot valve such that the cylinder 35 and the valve 11 are separated by a partition 36. The hydraulic pressure-holding cylinder and the pilot valve can also, however, be separate components. In the chamber above a holding piston 37 of the hydraulic pressure-holding cylinder there is provided a restoring spring 38. The piston rod 39 of the holding piston extends through the partition 36 to connect with the valve core 17 of the pilot valve, and between the piston rod and the partition there is provided a sealing means.

The restoring valve 41 is a conventional two-position three-way piston valve and can be installed on the fluid pipe 3 on the downstream side of main valve 1 with a support. In the restoring valve there is provided a restoring valve core 42, and the lower end of a restoring valve stem 43 connected with the restoring valve core 42 extends into the fluid pipe 3 by an appropriate depth such that a running pipeline pig 19 can push upward the restoring valve stem and hence the restoring valve core. Between the restoring valve stem and the fluid pipe there is provided a sealing means. At the lower portion of the case 44 of the restoring valve there is formed an atmosphere connection port 45 which is open to the valve cavity. At the upper portion of the case 44 there is formed an inlet 46 open to the valve cavity, and at the middle portion of the case there is formed an outlet 47 open to the valve cavity. The inlet 46 is connected to the lower chamber 10 of the hydraulic cylinder 6 via a pipeline 48. Inlet 46 can also be directly connected to the lower chamber connection port 14 of the pilot valve 11 via pipeline 48. The outlet 47 is connected to the chamber under the holding piston 37 of the hydraulic pressure-holding cylinder 35 via a pipeline 49. In the valve cavity above the restoring valve core 42 of the restoring valve there is provided a restoring spring 50. Under the atmosphere connection port 45 there can be provided a reservoir 51.

When the fluid-controlled valve for pipeline pig of the third embodiment is in the normal working state as shown in FIG. 4, the operating mode of the pilot valve 11, the hydraulic cylinder 6 and the main valve 1 is the same as that in embodiment 1. At this time, the restoring valve core 42 in the restoring valve 41 is located at the lower portion of the valve case 44 under the action of the spring 50, and the restoring valve stem 43 extends into the fluid pipe 3. The hydraulic pressure-holding cylinder 35 is connected with the lower chamber 10 of the hydraulic cylinder 6 via pipeline 49, outlet 47 of the restoring valve, the valve cavity above the restoring valve core, inlet 46 and pipeline 48. Furthermore, hydraulic pressure-holding cylinder 35 is opened to the atmosphere via pipeline 25, two-way control valve 28, lower chamber connection port 14 of the pilot valve 11, release passage way 23 and atmosphere connection port 16. The holding piston 37 in the hydraulic pressure-holding cylinder 35 is at the lower portion of the hydraulic pressure-holding cylinder under the action of the spring 38, causing the pilot valve core 17 of the pilot valve 11 to be held at the lower portion of the valve body through the piston rod 39 of the holding piston. Under the action of the fluid pressure, the piston 7 in the hydraulic cylinder 6 is at the lower portion of the hydraulic cylinder, and at the same time, the main valve core is pushed to its lower working position to control the flow of the fluid.

When using a pipeline pig to clean the fluid pipe such that the pipeline pig 19 comes to the pilot valve 11, as shown in FIG. 5, the pilot valve 11, the hydraulic cylinder 6 and the main valve 1 operate in the same way as that described in connection with Embodiment 1. At this time, the restoring valve stem 43 of the restoring valve 41 remains extended into the fluid pipe 3, and the restoring valve core 42 remains at the lower portion of the case. Part of the pressurized fluid, which has entered the lower chamber 10 of the hydraulic cylinder 6, enters the cylinder chamber under the holding piston 37 of the hydraulic pressure-holding cylinder 35 via pipeline 48, inlet 46 of the restoring valve 41, the valve cavity above the restoring valve core, outlet 47 and pipeline 49. This keeps holding piston 37 and pilot valve core 17 (FIG. 1) of the pilot valve 11 at the ascended position, thus keeping the flow path from the fluid pipe 3 to the lower chamber 10 of the hydraulic cylinder 6 in an open state. Therefore, the pressurized fluid in the fluid pipe 3 continuously enters the lower chamber of the hydraulic cylinder to push piston 7 upwards to the upper portion of the hydraulic cylinder and thereby lift the main valve core such that the flow path of the main valve coincides with and communicates with the flow path of the fluid pipe to let the pipeline pig pass through smoothly. That is, the fluid-controlled valve is now in the state allowing the pipeline pig to pass.

When the pipeline pig 19 comes to the restoring valve 41, as shown in FIG. 6, the pipeline pig 19 pushes the restoring valve stem 43 of the restoring valve 41 upward against the biasing force of the spring 50, causing the restoring valve core 42 to move upward to the upper portion of the case 44. The inlet 46 in the case is blocked by the restoring valve core 42, and the outlet 47 is connected with the atmosphere connection port 45 via the valve cavity under the restoring valve core. The fluid in the cylinder chamber under the holding piston 37 in the hydraulic pressure-holding cylinder 35 is discharged from the atmosphere connection port 45 or is discharged into the reservoir 51 under the atmosphere connection port via pipeline 49, outlet 47 of the restoring valve and the valve cavity. The hydraulic pressure-holding cylinder is released from pressure, and the holding piston 37 returns to its original position under the action of the spring 38, thereby pushing the piston rod 39 together with the pilot valve core 17 of the pilot valve 11 downward to make them return to the original position. Correspondingly, the hydraulic cylinder 6 and the main valve 1 also return to their original position, and the fluid-controlled valve returns to its normal working state.

Moreover, as in the first embodiment, the controller of the fluid-controlled valve for pipeline pig of this embodiment can also be provided with an electromagnetic switch 29 and an electric controller 32. Correspondingly, the disk 30 cooperating with the electromagnetic switch 29 is connected with the holding piston 37 through a connecting rod 40. Therefore, it is possible to control the working state of the main valve 1 by operating the controller, as shown in FIGS. 4 and 5.

Embodiment 4

Figure 7:
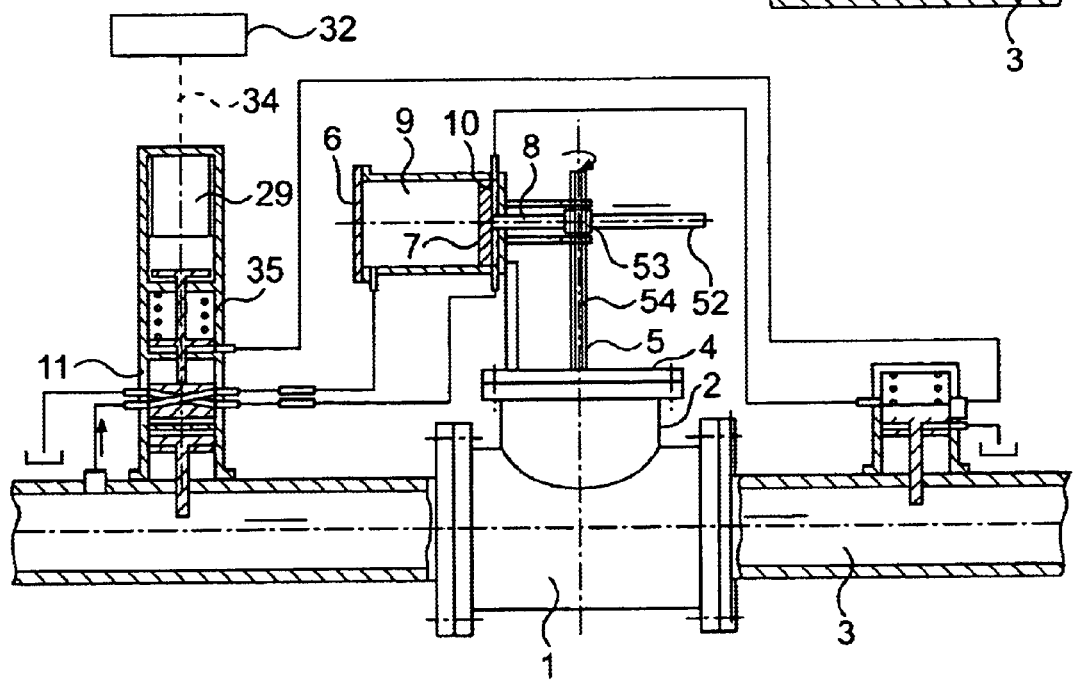
FIG. 7 is a schematic view showing the structure of a fluid-controlled valve for pipeline pig in accordance with the fourth embodiment of the invention.

The fluid-controlled valve for pipeline pig in accordance with the fourth embodiment of the invention is shown in FIG. 7. Except as discussed below, its general arrangement is substantially the same as that in Embodiment 3.

The hydraulic cylinder 6 is secured to the valve body 2 of the main valve 1 transversely by means of a support. The piston rod 8 and the main valve stem 5 are perpendicular to each other, and the piston rod 8 of the hydraulic cylinder has a rack 52 formed on its end which extends beyond the hydraulic cylinder.

A gear 53, which meshes with the rack 52, is fixedly mounted on the main valve stem 5 of the main valve 1 so that the main valve stem 5 rotates as the piston rod 8 reciprocates. The main valve stem is secured to the main valve core. Correspondingly, a valve with a rotating valve core, e.g. a ball valve, is used as the main valve.

As an alternative, axial sliding grooves 54 may be formed on the main valve stem 5 such that the main valve stem has a structure similar to that of a spline shaft, and a gear 53 is mounted slidingly on the main valve stem. The lower end of the main valve stem is rotably connected with the main valve core, and the main valve stem and the valve cover 4 are connected with each other and form a screw pair. Thus, when the piston rod 8 of the hydraulic cylinder reciprocates, the main valve stem moves up and down while rotating, thereby driving the main valve core to move reciprocally up and down. Therefore, the main valve can be a gate valve, a sluice valve, a plunger valve, etc.

The operation of this valve is substantially the same as that of Embodiment 3.

Embodiment 5

Figure 8:
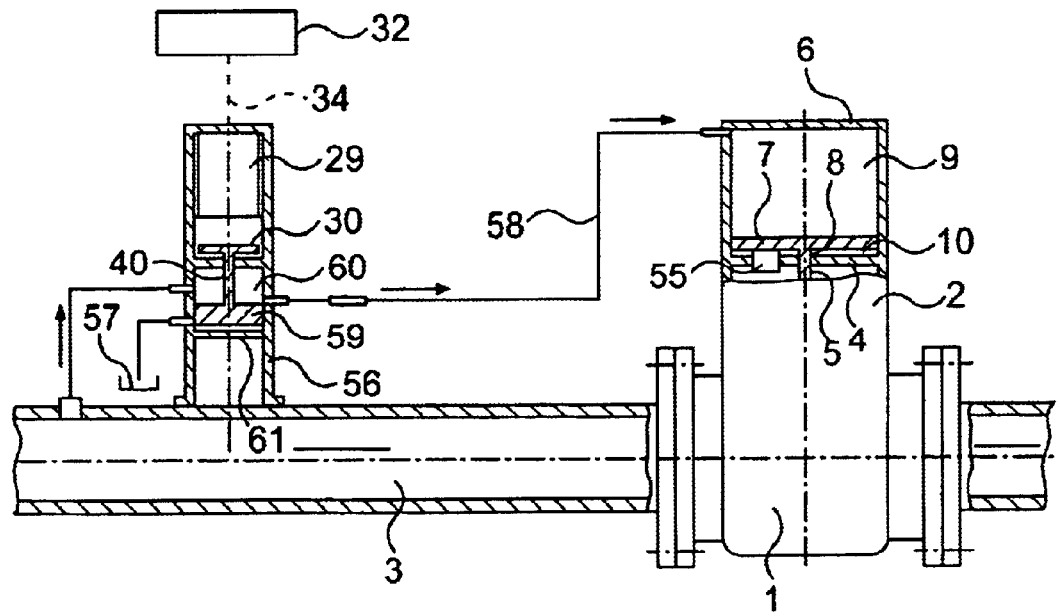
FIG. 8 is a schematic view showing the structure of a fluid-controlled valve for pipeline pig in accordance with the fifth embodiment of the invention, wherein the main valve is in a normal working state for controlling the fluid.
Figure 9:
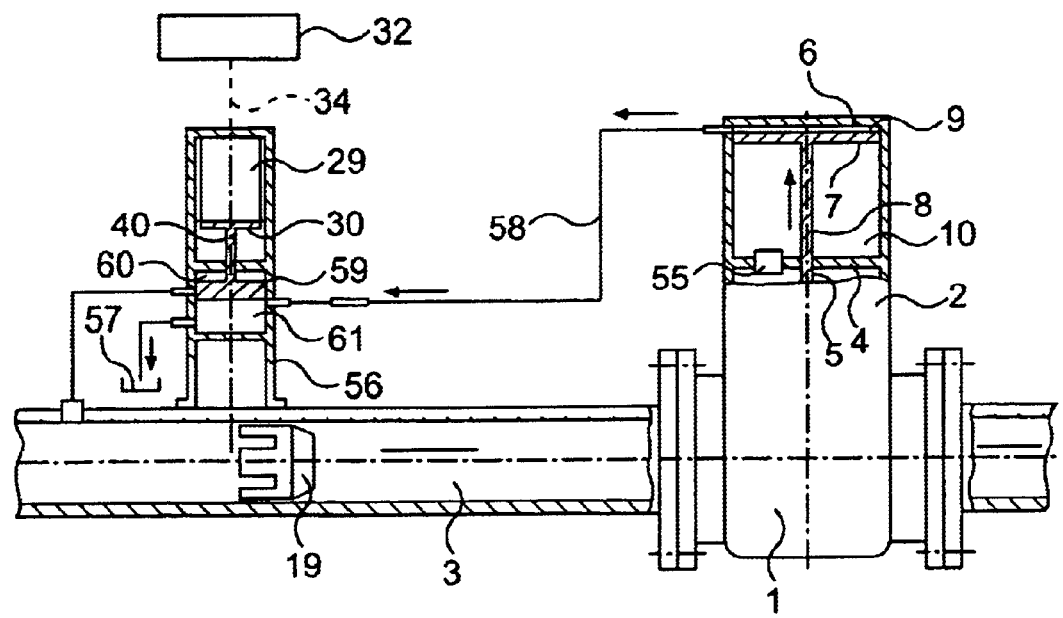
FIG. 9 is a schematic view showing the structure of a fluid-controlled valve for pipeline pig in accordance with the fifth embodiment of the invention, wherein the main valve is in a state for allowing a pipeline pig to pass.

FIGS. 8 and 9 illustrate the fifth embodiment of the fluid-controlled valve for pipeline pig in accordance with the present invention. As shown in FIGS. 8 and 9, the fluid-controlled valve for pipeline pig of this embodiment is also comprised of a main valve 1 and a controlling device, wherein the controlling device is comprised of a hydraulic cylinder 6, a pilot valve 56, a controller and the like.

The structure of the main valve 1 is the same as that of the main valve described in Embodiment 1.

Except as described below, the hydraulic cylinder 6 is substantially the same as that described in Embodiment 1. On the valve cover 4 of the main valve in this embodiment, however, there is formed a through hole which communicates the lower chamber 10 of the hydraulic cylinder and the valve cavity of the main valve 1, and in the through hole there is mounted a conventional two-way control valve 55 which is capable of controlling the flow in two directions. The lower chamber 10 of the hydraulic cylinder is communicated with the fluid pipe 3 via the two-way control valve and the valve cavity of the main valve 1. The inventor's adjustable differential flow shuttle valve noted above can be used as the two-way control valve.

The pilot valve 56 is a conventional piston valve and can be installed on the fluid pipe 3 by means of a support, although the pilot valve can also be installed on the main valve 1 or integrated with the main valve. At the upper portion of the valve cavity of the pilot valve there is formed a port which can connect with the fluid pipe 3 through a pipeline. At the lower portion of the valve cavity there is formed a port which is open to the atmosphere or is connected with the reservoir 57 through a pipeline, and at the middle of the valve cavity of the pilot valve there is formed a port which is connected with the upper chamber 9 of the hydraulic cylinder 6 through a pipeline 58. When the pilot valve core 59 of the pilot valve moves to the lower portion of the valve cavity, the upper chamber 9 of the hydraulic cylinder is connected with the fluid pipe 3 via a pressurized chamber 60 formed above the valve core 59 of the pilot valve. When the pilot valve core moves to the upper portion of the valve cavity, the upper chamber 9 of the hydraulic cylinder is open to the atmosphere via a release chamber 61 formed under the valve core 59 of the pilot valve. The valve stem 40 connected with the pilot valve core extends out of the valve case upward. Sealing means is provided between the valve stem and the valve case, and a disk 30 is provided at the upper end of the valve stem.

As in the first embodiment, the controller is comprised of an electromagnetic switch 29, an electric controller 32 and a connecting wire 34.

For the fluid-controlled valve for pipeline pig of this embodiment, during the normal operation for controlling the fluid or when cleaning the fluid pipe with a pipeline pig, the electric controller 32 is used to control the pilot valve 56 by means of the electromagnetic switch 29. When it is necessary to clean the fluid pipe, the electric controller 32 is activated so that the electromagnetic switch 29 attracts and engages the disk 30, thereby lifting the pilot valve core 59. At this time, the upper chamber 9 of the hydraulic cylinder 6 is open to the atmosphere via pipeline 58 and the release chamber 61 of the pilot valve. Pressurized fluid in the fluid pipe 3 enters the .lower chamber 10 of the hydraulic cylinder 6 via the valve cavity of the main valve 1 and the two-way control valve 55 and pushes the piston 7 and hence the main valve core upwards, causing the flow path of the main valve to coincide and communicate with the flow path of the fluid pipe. When the electric controller 32 is deactivated to cause the electromagnetic switch 29 to release the disk 30, the pilot valve core 59 moves downward under the action of gravity or a biasing device otherwise provided, and upper chamber 9 of the hydraulic cylinder 6 is connected with the fluid pipe 3 via the pipeline 58 and the pressurized chamber 60 of the pilot valve. The pressurized fluid in the fluid pipe 3 enters the upper chamber 9 of the hydraulic cylinder under the combined action of the pressurized fluid in upper chamber 9 and the gravity of piston 7, piston rod 8, main valve stem 5 and the main valve core or under the action of a biasing device otherwise provided. Piston 7 and hence the main valve core move downward, causing the fluid in the lower chamber 10 to return to the fluid pipe 3 via the two-way control valve 55 and the valve cavity of the main valve 1. As a result, the main valve 1 returns to its normal working state. When the fluid-controlled valve of this embodiment is in the normal working state, it is possible to control the opening, closing and degree of openness of the main valve through the pilot valve and the hydraulic cylinder by operating the electric controller so as to control to the flow of the fluid.

Embodiment 6

Figure 10:
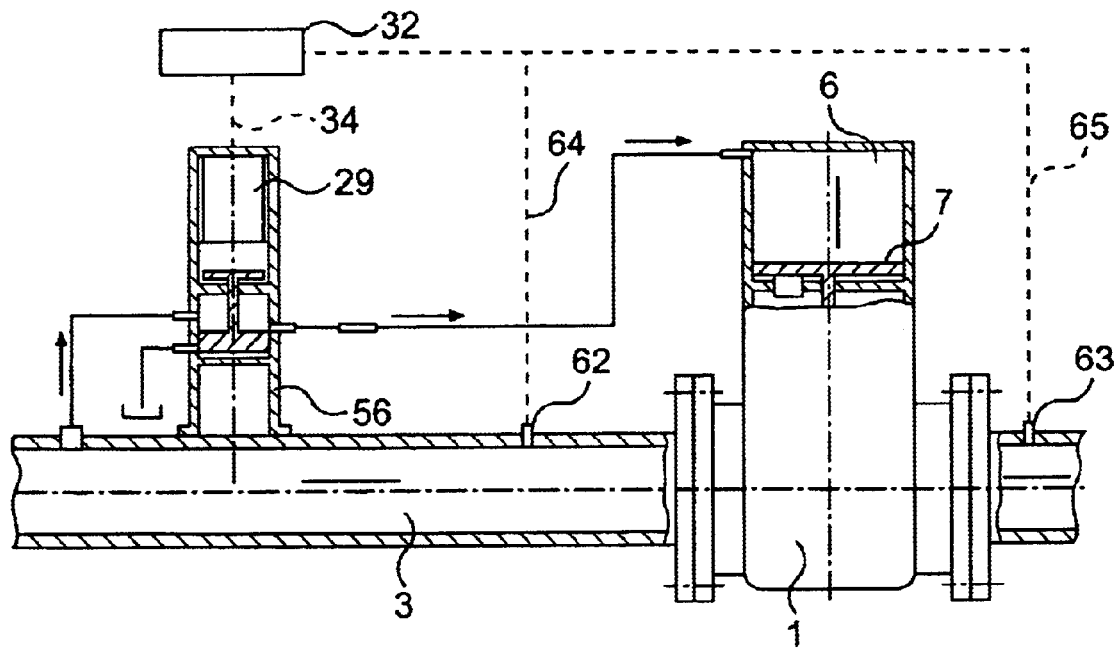
FIG. 10 is a schematic view showing the structure of a fluid-controlled valve for pipeline pig in accordance with the sixth embodiment of the invention.

FIG. 10 illustrates the sixth embodiment of the fluid-controlled valve for pipeline pig in accordance with the invention. As shown in FIG. 10, the fluid-controlled valve for pipeline pig of this embodiment is substantially the same in structure as that of Embodiment 5. The controller is further provided, however, with two sensors 62 and 63, which are respectively mounted on the fluid pipe 3 on the upstream side and the downstream side of the main valve 1. The two sensors are respectively electrically connected with the electric controller 32 through wires 64 and 65. A conventional inductance sensor, which can cooperate with the pipeline pig 19, can be used as the sensor.

The two sensors 62 and 63 respectively transmit to the electric controller the signals indicative of the arrival of the running pipeline pig at the upstream side and at the downstream side of the main valve, and the electric controller controls the pilot valve 56 and the hydraulic cylinder 6 responsive to the signals received to thereby control the main valve 1. The automatic control of the main valve 1 can be realized with the fluid-controlled valve for pipeline pig of this embodiment.

Embodiment 7

Figure 11:
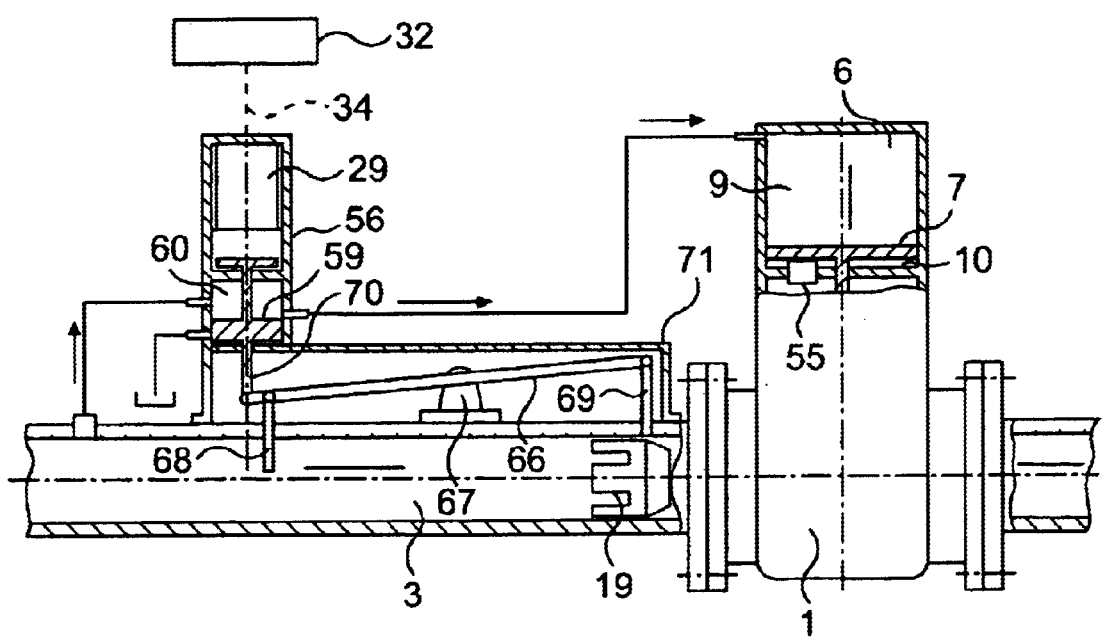
FIG. 11 is a schematic view showing the structure of a fluid-controlled valve for pipeline pig in accordance with the seventh embodiment of the invention, wherein the main valve is in a normal working state for controlling the fluid.
Figure 12:
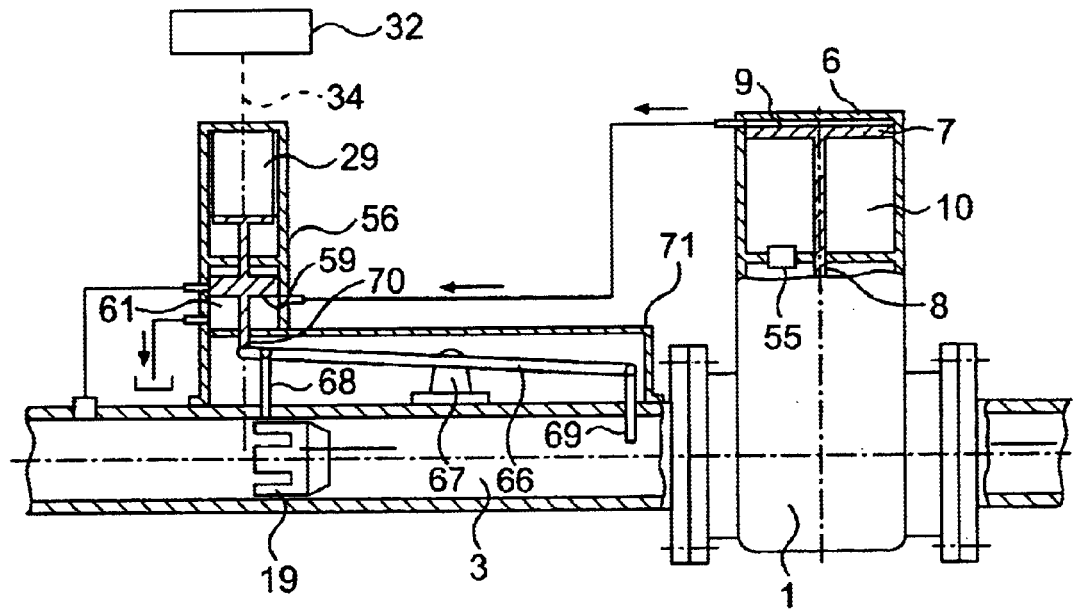
FIG. 12 is a schematic view showing the structure of a fluid-controlled valve for pipeline pig in accordance with the seventh embodiment of the invention, wherein the main valve is in a state for allowing a pipeline pig to pass.

FIGS. 11 and 12 illustrate the seventh embodiment of the fluid-controlled valve for pipeline pig of the invention. As shown in FIGS. 11 and 12, the arrangement of the fluid-controlled valve for pipeline pig of this embodiment is substantially the same as that of Embodiment 5, except that the controller is further provided with a lever mechanism.

The lever mechanism comprises a lever 66 extending along the fluid pipe 3 and pivotally mounted on a support 67 which can be secured on the fluid pipe 3. The front end and the rear end of the lever, which are located respectively on the front side and on the rear side of the pivoting point of the lever, are respectively pivotally connected with a push rod 68 and a push rod 69, each of which are extendable into the fluid pipe 3 by an appropriate depth on the upstream side of the main valve 1. A sealing means is provided between the push rods and the fluid pipe. The distance between the two push rods is determined by the running speed of the pipeline pig and the moving speed of the piston 7 of the hydraulic cylinder to ensure that piston 7 has enough time to reach its upper position. Furthermore, the distance between the push rod 69 and the main valve should also be determined by the running speed of the pipeline pig and the moving speed of the piston of the hydraulic cylinder to ensure that there is enough time for the pipeline pig to pass through the main valve.

A pilot valve stem 70 is fixedly connected with the valve core of the pilot valve 56 and pivotally connected to the end of the lever upstream of the lever pivoting point to thereby form a lever-type detecting mechanism. It is also possible, however, to pivotally connect the other end of lever (i.e. the end on the downstream side of the lever pivoting point) with the pilot valve stem. With the latter arrangement, the pilot valve should have such a structure so that its pressurized chamber, which connects with the fluid pipe, is located under the valve core, and the release chamber 61, which is open to the atmosphere, is located above the valve core. The lever-type detecting mechanism can be protected by providing a shield 71.

The present fluid-controlled valve, when in a normal working state for controlling the fluid, operates the same way as that of Embodiment 1. That is, the electromagnetic switch 29 is controlled by operating the electric controller 32, and the opening, closing and degree of openness of the main valve 1 is controlled by the pilot valve 56 and the hydraulic cylinder 6 so as to control the flow of the fluid.

The operation of the lever-type detecting mechanism will be described below. When, upon cleaning the fluid pipe with a pipeline pig, the pipeline pig 19 comes to the push rod 68, as shown in FIG. 12, the pipeline pig 19 pushes the push rod 68 upward, causing the lever 66 to pivot and the push rod 69 to descend. Due to the rotation of the lever 66, the pilot valve stem 70 and hence the pilot valve core 59 move upward. As a result, the upper chamber 9 of the hydraulic cylinder 6 is open to the atmosphere via the release chamber 61 to discharge the fluid in the upper chamber, and the pressurized fluid in the fluid pipe enters the lower chamber 10 of the hydraulic cylinder via the valve cavity of the main valve 1 and the two-way control valve 55. Piston 7 thereby ascends and lifts the main valve core via the piston rod 8 and the main valve stem 5 to open the main valve so that the pipeline pig can pass through.

When the pipeline pig 19 comes to the push rod 69, as shown in FIG. 11, the pipeline pig 19 pushes the push rod 69 upward, causing the lever 66 to pivot and the push rod 68 to descend. Due to the rotation of the lever 66, the pilot valve stem 70 and hence the pilot valve core 59 descend and return to the original position. The upper chamber 9 of the hydraulic cylinder 6 is connected with the fluid pipe 3 via the pressurized chamber 60, through which the pressurized fluid enters the upper chamber. Fluid in the lower chamber 10 of the hydraulic cylinder flows into the valve cavity of the main valve via the two-way control valve 55. The flow rate at which the fluid in the lower chamber 10 of the hydraulic cylinder flows into the valve cavity of the main valve is adjusted by the two-way control valve 55, so that the descending speed of the piston 7 and hence the main valve core is controlled to ensure that the pipeline pig passes through the main valve smoothly. After the pipeline pig has passed through the main valve, the piston 7 and hence the main valve core descend and return to the original position, and the fluid-controlled valve returns to the normal working state.

As an alternative, the push rod 68 pivotally connected to the lever 66 can be omitted, and the end of the pilot valve stem 70 of the pilot valve 56, which is pivotally connected to the lever, may extend into the fluid pipe 3 by an appropriate depth.

As another alternative, the push rod 68 pivotally connected to the lever 66 can extend into fluid pipe 3 by an appropriate depth on the downstream side of the main valve 1. In this case, the operation of the fluid-controlled valve is similar to that shown in FIG. 10.

As still another alternative, a two-way control valve having a time delay function is used as the two-way control valve 55 (See China Patent No. 87103004.7 granted to the inventor, filed in 1987), and the pipeline pig passes through the main valve during the time delay caused by the two-way control valve.

Furthermore, the lower chamber 10 of the hydraulic cylinder can also be connected with the fluid pipe 3 through a pipeline, and the two-way control valve is provided in the pipeline.

Embodiment 8

Figure 13:
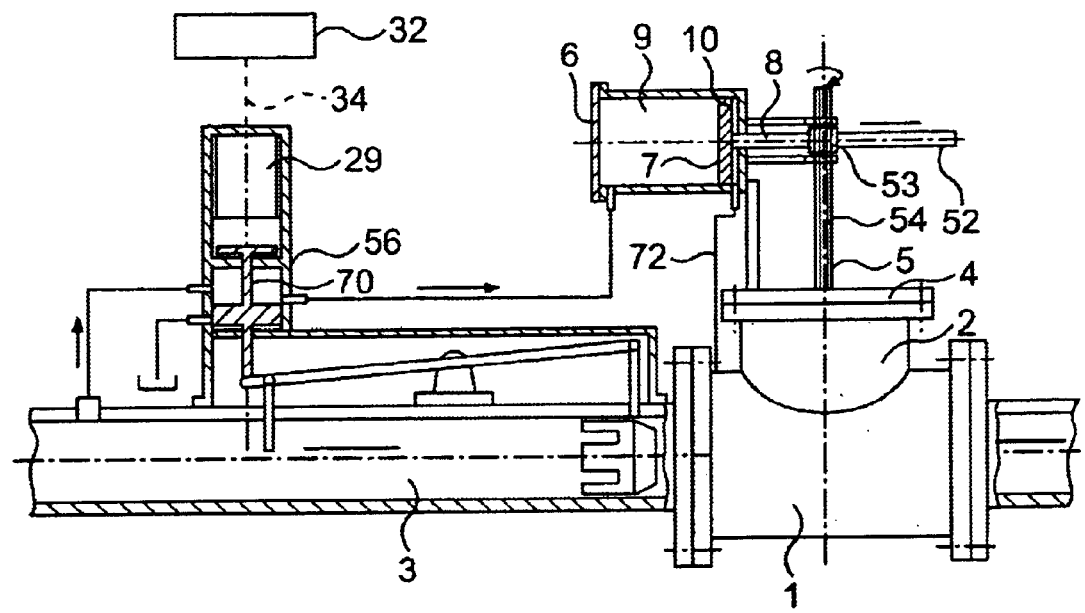
FIG. 13 is a schematic view showing the structure of a fluid-controlled valve for pipeline pig in accordance with the eighth embodiment of the invention.

FIG. 13 illustrates the eighth embodiment of the fluid-controlled valve for pipeline pig of the invention. As shown in FIG. 13, the general arrangement of this embodiment is substantially the same as that of Embodiment 7, except as described below.

The hydraulic cylinder 6 is secured to the valve body 2 of the main valve 1 transversely by means of a support. The lower chamber 10 of the hydraulic cylinder is connected with the valve cavity of the main valve 1 through a pipeline 72, in which a two-way control valve can be provided. The piston rod 8 and the main valve stem 5 are perpendicular to each other, and the piston rod 8 of the hydraulic cylinder has a rack 52 formed on its end which extends beyond the hydraulic cylinder.

A gear 53, which meshes with the rack 52, is fixedly mounted on the main valve stem 5 of the main valve 1 so that the main valve stem 5 rotates as the piston rod 8 reciprocates. The main valve stem is secured to the main valve core. Correspondingly, a valve with a rotating valve core, e.g. a ball valve, is used as the main valve.

As an alternative, axial sliding grooves 54 may be formed on the main valve stem 5 such that the main valve stem has a structure similar to that of a spline shaft, and a gear 53 is mounted slidingly on the main valve stem. The lower end of the main valve stem is rotatably connected with the main valve core, and the main valve stem and the valve cover 4 are connected with each other and form a screw pair. Thus, when the piston rod 8 of the hydraulic cylinder reciprocates, the main valve stem moves up and down while rotating, thereby driving the main valve core to move reciprocally up and down. Therefore, the main valve can be gate valve, a sluice valve, a plunger valve, etc.

The operation of the fluid-controlled valve of this embodiment is substantially the same as that of Embodiment 7.

What is claimed is:

1. A fluid-controlled valve for pipeline pig, comprising:
    a main valve, said main valve comprising
        a valve body connected with a fluid pipe,
        a main valve core movably disposed in an inner cavity of the valve body through which a pipeline pig is passable, and
        a main valve stem connected with the main valve core; and
    a controlling device, said controlling device comprising
        a hydraulic cylinder, said hydraulic cylinder comprising a piston disposed in a housing of the hydraulic cylinder and a piston rod connected with the piston, the piston rod being operationally connected with said main valve stem so as to control the main valve core through the main valve stem,
        valve means including a pilot valve, said pilot valve being provided in a pipeline which connects the fluid pipe and the hydraulic cylinder, and
        a controller operationally connected to the fluid pipe and the pilot valve so that the pipeline pig, when moving through the fluid pipe toward the main valve, triggers actuation of the pilot valve to thereby control reciprocating movement of the piston by pressurized fluid in the fluid pipe.

2. The fluid-controlled valve for pipeline pig as claimed in claim 1, wherein the hydraulic cylinder defines first and second chambers separated by the piston, wherein said pilot valve controls communication of the first and second chambers to the fluid pipe or the atmosphere, wherein the pilot valve includes a pilot valve core movable to a first working position responsively to the controller and to a second working position responsively to the controller, wherein the fluid pipe is communicated with the first chamber of the hydraulic cylinder when the pilot valve core is at its first working position, and wherein the fluid pipe is communicated with the second chamber of the hydraulic cylinder when the pilot valve core is at its second working position.

3. The fluid-controlled valve for pipeline pig as claimed in claim 1, wherein the hydraulic cylinder defines two chambers separated by the piston, wherein said pilot valve controls communication of a second chamber of the two chambers to the fluid pipe or the atmosphere, wherein said valve means further comprises a two-way control valve provided in a passage between the fluid pipe and a first chamber of the two chambers, wherein the pilot valve includes a pilot valve core movable to a first working position responsively to the controller and to a second working position responsively to the controller, wherein fluid in the fluid pipe enters the first chamber of the hydraulic cylinder via the two-way control valve when the pilot valve core is at its first working position, and wherein fluid in the fluid pipe enters said second chamber of the hydraulic cylinder via the pilot valve when the pilot valve core is at its second working position.

4. The fluid-controlled valve for pipeline pig as claimed in claim 2 or 3, wherein said controller comprises an electric controller which controls actuation of the pilot valve through an electromagnetic switch.

5. The fluid-controlled valve for pipeline pig as claimed in claim 4, wherein said controller further comprises a first sensor connected with the electric controller and mounted on the fluid pipe downstream of the main valve so that the first sensor detects passage of the pipeline pig and outputs a passage signal to the electric controller responsively thereto, and wherein the electric controller disconnects a power supply to the electromagnetic switch responsive to the passage signal, thereby deactuating the controller.

6. The fluid-controlled valve for pipeline pig as claimed in claim 5, wherein said controller further comprises a second sensor connected with the electric controller and mounted on the fluid pipe upstream of the main valve so that the second sensor detects passage of the pipeline pig and outputs a passage signal to the electric controller responsively thereto, and wherein the electric controller activates the power supply to the electromagnetic switch responsive to the passage signal from the second sensor.

7. The fluid-controlled valve for pipeline pig as claimed in claim 5, wherein said controller further comprises a pilot valve stem connected with the pilot valve core so that when the pilot valve core is at its second working position, an end of the pilot valve stem facing away from the pilot valve core extends into the fluid pipe upstream of the main valve so that when the pipeline pig running through the fluid pipe engages the pilot valve stem, the pilot valve stem is pushed outward, thereby energizing the electromagnetic switch.

8. The fluid-controlled valve for pipeline pig as claimed in claim 2,
    wherein said controller further comprises a pilot valve stem connected with the pilot valve core so that when the pilot valve core is at its second working position, an end of the pilot valve stem facing away from the pilot valve core extends into the fluid pipe upstream of the main valve so that when the pipeline pig running through the fluid pipe engages the pilot valve stem, the pipeline pig pushes the pilot valve stem outward to move the pilot valve core to its first working position,
    wherein said controller further comprises a hydraulic pressure-holding cylinder operationally connected with the pilot valve and a restoring valve having a valve core connected with a restoring valve stem, the restoring valve core together with the restoring valve stem being biased by a spring to a first working position at which an end of the restoring valve stem facing away from the restoring valve core extends into the fluid pipe downstream of the main valve so that when the pipeline pig running through the pipeline engages the restoring valve stem, the pipeline pig pushes the restoring valve stem outward against bias of the spring to move the restoring valve core to a second working position,
    wherein when the pilot valve core is pushed outward by the pipeline pig to its first working position, the hydraulic pressure-holding cylinder is connected with the fluid pipe through the restoring valve and the pilot valve so as to hold the pilot valve core at its first working position, and
    wherein when the restoring valve is pushed outward by the pipeline pig to its second working position, the hydraulic pressure-holding cylinder is open to the atmosphere through the restoring valve, thereby causing the pilot valve core to return to its second working position.

9. The fluid-controlled valve for pipeline pig as claimed in claim 2, wherein said pilot valve is a two-position four-way valve.

10. The fluid-controlled valve for pipeline pig as claimed in claim 8, wherein said restoring valve is a two-position three-way valve.

11. The fluid-controlled valve for pipeline pig as claimed in claim 2 or 3, wherein pipelines are provided between said hydraulic cylinder and said pilot valve and wherein there are provided respective two-way control valves on the pipeline.

12. The fluid-controlled valve for pipeline pig as claimed in claim 2, wherein said controller comprises an electric controller which controls actuation of the pilot valve through an electromagnetic switch, and wherein when said main valve is in a normal working state for controlling flow of fluid through the fluid pipe, control of the pilot valve through the electric controller and the electromagnetic switch controls communication between the fluid pipe or the atmosphere and the second chamber or the first chamber of the hydraulic cylinder to thereby control ascension and descension of the piston of the hydraulic cylinder to thereby control opening, closing and degree of openness of the main valve, thereby realizing control of the fluid.

13. The fluid-controlled valve for pipeline pig as claimed in claim 3,
wherein said controller further comprises
a pilot valve stem connected with the valve core of the pilot valve, and
a lever extending along the fluid pipe, two ends of the lever located respectively on opposite sides of a pivoting point of the lever being pivotally connected with first and second push rods, respectively, wherein one of the lever ends is upstream of the pivoting point with respect to fluid flow in the fluid pipe and the other end of the lever is downstream of the pivoting point, and said pilot valve stem being pivotally connected to the upstream end of the lever,
wherein when the pilot valve core is at its second working position, the first push rod upstream of the pivoting point extends into the fluid pipe upstream of the main valve so that when the pipeline pig running through the fluid pipe engages the first push rod, the pipeline pig pushes the first push rod outward to thereby cause the pilot valve core to move to its first working position,
wherein when the pilot valve core is at its first working position, the second push rod downstream of said pivoting point extends into the fluid pipe upstream of the main valve so that when the pipeline pig running through the fluid pipe engages the second push rod, the pipeline pig pushes the second push rod outward to thereby cause the pilot valve core to move to its second working position, and
wherein said two-way control valve adjusts a speed at which fluid in said first chamber of the hydraulic cylinder flows into the fluid pipe, thereby controlling moving speed of the main valve core to permit sufficient time for the pipeline pig to pass through the main valve.

14. The fluid-controlled valve for pipeline pig as claimed in claim 3,
wherein said controller further comprises
a pilot valve stem connected with the valve core of the pilot valve, and
a lever extending along the fluid pipe and pivotally connected with a push rod downstream, with respect to fluid flow in the fluid pipe, of a pivoting point of the lever, said pilot valve stem being pivotally connected to an end of the lever upstream of the pivoting point,
wherein when the pilot valve core is at its second working position, said pilot valve stem extends into the fluid pipe upstream of the main valve so that when the pipeline pig running through the fluid pipe engages the pilot valve stem, the pipeline pig pushes the pilot valve stem outward to thereby cause the pilot valve core to move to its first working position,
wherein when the pilot valve core is at its first working position, said push rod downstream of said pivoting point extends into the fluid pipe upstream of the main valve so that when the pipeline pig running through the fluid pipe engages the push rod, the pipeline pig pushes the push rod outward to thereby cause the pilot valve core to move to its second working position, and
wherein said two-way control valve adjusts a speed at which fluid in said first chamber of the hydraulic cylinder flows into the fluid pipe, thereby controlling moving speed of the main valve core to permit sufficient time for the pipeline pig to pass through the main valve.

15. The fluid-controlled valve for pipeline pig as claimed in claim 14, wherein said two-way control valve is a two-way control valve having a time delay function, and wherein the pipeline pig passes through the main valve during a time delay caused by the two-way control valve.

16. The fluid-controlled valve for pipeline pig as claimed in claim 3,
wherein said controller further comprises
a pilot valve stem connected with the valve core of the pilot valve, and
a lever extending along the fluid pipe, two ends of the lever located respectively on opposite sides of a pivoting point of the lever being pivotally connected with first and second push rods, respectively, wherein one of the ends of the lever is upstream of the pivoting point with respect to fluid flow in the fluid pipe and the other end of the lever is downstream of the pivoting point, and said pilot valve stem being pivotally connected to the upstream end of the lever,
wherein when the pilot valve core is at its second working position, the first push rod upstream of said pivoting point extends into the fluid pipe upstream of the main valve so that when the pipeline pig running through the fluid pipe engages the first push rod, the pipeline pig pushes the first push rod outward to thereby cause the pilot valve core to move to its first working position, and
wherein when the pilot valve core is at its first working position, the second push rod downstream of said pivoting point extends into the fluid pipe downstream of the main valve so that when the pipeline pig running through the fluid pipe engages the second push rod, the pipeline pig pushes the second push rod outward to thereby cause the pilot valve core to move to its second working position.

17. The fluid-controlled valve for pipeline pig as claimed in claim 3,
wherein said controller further comprises
a pilot valve stem connected with the valve core of the pilot valve, and
a lever extending along the fluid pipe and pivotally connected with a push rod downstream, with respect to fluid flow in the fluid pipe, of a pivoting point of the lever, said pilot valve stem being pivotally connected to an end of the lever upstream of the pivoting point, wherein when the pilot valve core is at its second working position, said pilot valve stem extends into the fluid pipe upstream of the main valve so that when the pipeline pig running through the fluid pipe engages the pilot valve stem, the pipeline pig pushes the pilot valve stem outward to thereby cause the pilot valve core to move to its first working position, wherein and when the pilot valve core is at its first working position, said push rod downstream of said pivoting point extends into the fluid pipe downstream of the main valve so that when the pipeline pig running through the fluid pipe engages the push rod, the pipeline pig pushes the push rod outward to thereby cause the pilot valve core to move to its second working position.

18. The fluid-controlled valve for pipeline pig as claimed in claim 3, wherein said pilot valve is a two-position three-way valve.

19. The fluid-controlled valve for pipeline pig as claimed in claim 3, wherein said controller comprises an electric controller which controls actuation of the pilot valve through an electromagnetic switch, and wherein when said main valve is in a normal working state for controlling flow of fluid through the fluid pipe, control of the pilot valve through the electric controller and the electromagnetic switch controls communication between the fluid pipe or the atmosphere and said second chamber of the hydraulic cylinder to thereby control opening, closing and degree of openness of the main valve, thereby realizing control of the fluid.

20. The fluid-controlled valve for pipeline pig as claimed in claim 1, wherein said piston rod of said hydraulic cylinder is coaxially connected with the main valve stem.

21. The fluid-controlled valve for pipeline pig as claimed in claim 1, wherein said piston rod of said hydraulic cylinder is connected with the main valve stem perpendicularly through a transmission so that the main valve stem rotates when said piston rod reciprocates, and wherein said main valve is a ball valve.

22. The fluid-controlled valve for pipeline pig as claimed in claim 1, wherein said piston rod of said hydraulic cylinder is connected with the main valve stem perpendicularly through a transmission so that when the piston rod reciprocates, the main valve stem moves axially while rotating.

23. A fluid-controlled valve for pipeline pig, comprising:
a main valve, said main valve comprising
a valve body connected with a fluid pipe,
a main valve core movably disposed in an inner cavity of the valve body through which a pipeline pig is passable, and
a main valve stem connected with the main valve core; and
a controlling device, said controlling device comprising
a hydraulic cylinder, said hydraulic cylinder comprising a piston disposed in a housing of the hydraulic cylinder and a piston rod connected with the piston, the piston rod being operationally connected with said main valve stem so as to control the main valve core through the main valve stem,
valve means including a pilot valve, said pilot valve being provided in a pipeline which connects the fluid pipe and the hydraulic cylinder, and
a controller for controlling actuation of the pilot valve to thereby control reciprocating movement of the piston by pressurized fluid in the fluid pipe, wherein said controller comprises an electric controller that actuates the pilot valve through an electromagnetic switch, wherein the hydraulic cylinder defines first and second chambers separated by the piston, wherein said pilot valve controls entry of the fluid in the fluid pipe into the first and second chambers, wherein the pilot valve includes a pilot valve core movable to a first working position responsively to the controller and a second working position responsively to the controller, wherein the fluid in the fluid pipe flows into the first chamber of the hydraulic cylinder when the pilot valve core is at its first working position, and wherein the fluid in the fluid pipe flows into the second chamber of the hydraulic cylinder when the pilot valve core is at its second working position.

24. The fluid-controlled valve for pipeline pig as claimed in claim 23, wherein said pilot valve controls communication of the first and second chambers to the fluid pipe or the atmosphere, wherein the fluid pipe is communicated with the first chamber of the hydraulic cylinder when the pilot valve core is at its first working position, and wherein the fluid pipe is communicated with the second chamber of the hydraulic cylinder when the pilot valve core is at its second working position.

25. The fluid-controlled valve for pipeline pig as claimed the claim 23, wherein said pilot valve controls communication of the second chamber to the fluid pipe or the atmosphere, wherein said valve means further comprises a two-way control valve provided in a passage between the fluid pipe and the first chamber, wherein fluid in the fluid pipe enters the first chamber of the hydraulic cylinder via the two-way control valve when the pilot valve core is at its first working position, and wherein fluid in the fluid pipe enters said second chamber of the hydraulic cylinder via the pilot valve when the pilot valve core is at its second working position.

26. The fluid-controlled valve for pipeline pig as claimed in claim 23, wherein said controller further comprises a first sensor connected with the electric controller and mounted on the fluid pipe downstream of the main valve so that the first sensor detects passage of the pipeline pig and outputs a passage signal to the electric controller responsively thereto, and wherein the electric controller disconnects a power supply to the electromagnetic switch responsive to the passage signal.

27. The fluid-controlled valve for pipeline pig as claimed in claim 24, wherein said pilot valve is a two-position four-way valve.

28. The fluid-controlled valve for pipeline pig as claimed in claim 23, wherein pipelines are provided between said hydraulic cylinder and said pilot valve and wherein there are provided respective two-way control valves on the pipelines.

29. The fluid-controlled valve for pipeline pig as claimed in claim 24, wherein when said main valve is in a normal working state for controlling flow of fluid through the fluid pipe, control of the pilot valve through the electric controller and the electromagnetic switch controls communication between the fluid pipe or the atmosphere and the second chamber or the first chamber of the hydraulic cylinder to thereby control ascension and descension of the piston of the hydraulic cylinder to thereby control opening, closing and degree of openness of the main valve, thereby realizing control of the fluid.

30. The fluid-controlled valve for pipeline pig as claimed in claim 25, wherein said pilot valve is a two-position three-way valve.

31. The fluid-controlled valve for pipeline pig as claimed in claim 25, wherein when said main valve is in a normal working state for controlling flow of fluid through the fluid pipe, control of the pilot valve through the electric controller and the electromagnetic switch controls communication between the fluid pipe or the atmosphere and said second chamber of the hydraulic cylinder to thereby control opening, closing and degree of openness of the main valve, thereby realizing control of the fluid.

32. The fluid-controlled valve for pipeline pig as claimed in claim 23, wherein said piston rod of said hydraulic cylinder is coaxially connected with the main valve stem.

33. The fluid-controlled valve for pipeline pig as claimed in claim 23, wherein said piston rod of said hydraulic cylinder is connected with the main valve stem perpendicularly through a transmission so that the main valve stem rotates when said piston rod reciprocates, and wherein said main valve is a ball valve.

34. The fluid-controlled valve for pipeline pig as claimed in claim 23, wherein said piston rod of said hydraulic cylinder is connected with the main valve stem perpendicularly through a transmission so that when the piston rod reciprocates, the main valve stem moves axially while rotating.

35. A fluid-controlled valve for pipeline pig, comprising:
a main valve comprising
a valve body connected with a fluid pipe, and
a main valve core movably disposed in an inner cavity of the valve body through which a pipeline pig is passable;
a hydraulic cylinder comprising
a housing, and
a piston disposed in the housing of the hydraulic cylinder, the piston being operationally connected with the main valve core so that movement of the piston moves the main valve core to thereby control opening, closing and degree of openness of the main valve;
a pilot valve provided in a pipeline which connects the fluid pipe and the hydraulic cylinder; and
a sensor disposed on the fluid pipe so that the sensor actuates responsively to presence of the pipeline pig in the fluid pipe at a position proximate the sensor,
wherein the sensor is operationally connected to the pilot valve so that actuation of the sensor moves the pilot valve to a first working position at which the pilot valve allows flow of fluid from the fluid pipe to the hydraulic cylinder to thereby move the piston and move the main valve core to a position allowing passage of the pipeline pig through the main valve.

36. The fluid-controlled valve for pipeline pig as claimed in claim 35, wherein the pilot valve comprises a pilot valve core that is movable to establish the first working position, and wherein the sensor comprises a pilot valve stem attached to the pilot valve core and extending into the fluid pipe upstream of the main valve so that when the pipeline pig running through the fluid pipe engages the pilot valve stem, the pipeline pig pushes the pilot valve stem outward, thereby moving the pilot valve core to establish the first working position of the pilot valve.

37. The fluid-controlled valve for pipeline pig as claimed in claim 35, wherein the sensor comprises an inductance sensor that outputs a passage signal when the pipeline pig reaches the position proximate the sensor.

38. The fluid-controlled valve for pipeline pig as claimed in claim 37, wherein the pilot valve comprises a pilot valve core that is movable to establish the first working position, wherein the fluid-controlled valve includes an electromagnetic switch in operational communication with the pilot valve core so that, when actuated responsively to the passage signal, the electromagnetic switch moves the pilot valve core to establish the first working position of the pilot valve.

39. A fluid-controlled valve for pipeline pig, comprising:
a main valve connected with a fluid pipe and configured to allow passage of a pipeline pig;
a hydraulic cylinder operationally connected with the main valve to control opening, closing and degree of openness of the main valve;
a pilot valve provided in a pipeline which connects the fluid pipe and the hydraulic cylinder; and
a sensor disposed on the fluid pipe so that the sensor actuates responsively to presence of the pipeline pig in the fluid pipe at a position proximate the sensor,
wherein the sensor is operationally connected to the pilot valve so that actuation of the sensor moves the pilot valve to a first working position at which the pilot valve allows flow of fluid from the fluid pipe to the hydraulic cylinder to thereby move the main valve to a position allowing passage of the pipeline pig through the main valve.

* * * * *

UNITED STATES PATENT AND TRADEMARK OFFICE
CERTIFICATE OF CORRECTION

PATENT NO. : 6,854,478 B1
APPLICATION NO. : 09/979807
DATED : February 15, 2005
INVENTOR(S) : Xiangwei Zeng It is certified that error appears in the above-identified patent and that said Letters Patent is hereby corrected as shown below:

In the specification:
In column 2, line 52, please delete the word "coaxial" and replace with --coaxially--.
In column 6, line 54, please delete the word "omtined" and replace with --omitted--.
In column 13, line 8, please delete the words "be gate" and replace with --be a gate--.

Signed and Sealed this

Eighth Day of July, 2008

JON W. DUDAS
*Director of the United States Patent and Trademark Office*